US005453999A

United States Patent [19]

Michaelson et al.

[11] Patent Number: 5,453,999
[45] Date of Patent: Sep. 26, 1995

[54] ADDRESS VERIFICATION SYSTEM USING PARITY FOR TRANSMITTING AND RECEIVING CIRCUITS

[75] Inventors: Wayne A. Michaelson, Circle Pines; Joseba A. DeSubijana, So., Minneapolis, both of Minn.

[73] Assignee: Unisys Corporation, Blue Bell, Pa.

[21] Appl. No.: 233,651

[22] Filed: Apr. 26, 1994

[51] Int. Cl.⁶ ................................................ G06F 11/10
[52] U.S. Cl. ............................................................. 371/51.1
[58] Field of Search ........................ 371/51.1; 364/265.3, 364/944.92, 944.4

[56] References Cited

U.S. PATENT DOCUMENTS

| | | | |
|---|---|---|---|
| 4,005,405 | 1/1977 | West | 340/146.1 AL |
| 4,531,213 | 7/1985 | Scheuneman | 371/3 |
| 4,596,014 | 6/1986 | Holeman | 371/49 |
| 4,692,893 | 9/1987 | Casper | 364/900 |
| 5,226,043 | 7/1993 | Pughe, Jr. et al. | 371/40.1 |
| 5,321,706 | 6/1994 | Holm et al. | 371/51.1 |
| 5,345,582 | 9/1994 | Tsuchiya | 395/575 |
| 5,392,302 | 12/1993 | Kemp et al. | 371/51.1 |

Primary Examiner—Robert W. Beausoliel, Jr.
Assistant Examiner—Stephen C. Elmore
Attorney, Agent, or Firm—Steven R. Funk; Charles A. Johnson; Mark T. Starr

[57] ABSTRACT

An address verification system for providing address error detection whether the error originates at the address generation circuitry, the address transmission path, or the address receiving circuitry. Multiple address generation circuits which simultaneously generate equivalent addresses each have associated parity generation circuits to provide parity bits for its associated address. Monitoring for unequal parity bits generated by the multiple parity generation circuits allows detection of address generation errors. Predetermined address parity bits for each potential address to be sent to the address-receiving circuitry are stored at the address-receiving circuitry to be compared to the parity bits issued by the multiple parity generation circuits. The predetermined address parity bits are determined prior to real-time address transmissions of the system, so that manual or automatic verification of the predetermined parity bits can be performed to ensure correctness of the predetermined address parity bits. The use of predetermined address parity bits which are stored at the address-receiving circuitry allows detection of address transmission and address receipt errors. Monitoring circuitry monitors for parity errors so that appropriate action may be taken upon recognition of such parity errors.

15 Claims, 6 Drawing Sheets

ADDRESS VERIFICATION SYSTEM USING PARITY FOR TRANSMITTING AND RECEIVING CIRCUITS

BACKGROUND OF THE INVENTION

1. Field of the Invention

This invention pertains to the detection of address errors, and more particularly to the detection of address sourcing errors, address transmission errors, and address receiving errors, through the use of redundant address driving devices, parity generation devices, and predetermined stored parity values.

2. Description of the Prior Art

The accuracy of data transmission is a vital element of digital systems. To provide protection against the use of erroneous data, parity is often used to detect possible errors in multiple bit data codes. A parity generation circuit generates a parity bit at the output of a data driving device which represents that either an odd or even number of bits in the multiple bit data codes are at an active logic level. A parity bit is also generated at the input of the data receiving device, which is compared to the parity bit generated at the output of the data driving device. A parity error occurs if the parity bits do not match, which indicates that a data error occurred during transmission of the data.

Parity checking may also be performed on address buses as well as data buses, which provides assurances against faulty addresses being driven on the address bus. The present invention performs address checking by using a parity scheme that checks the validity of the generated address and the validity of the received address. The validity of the generated address is checked by using a master and a slave address driver, each of which simultaneously drive an address. Both the master and the slave address buses are coupled to separate parity generation circuits to generate parity bits for the driven address. The parity bits associated with the master address driver and the parity bits associated with the slave address driver are then each compared with parity bits generated by the address-receiving circuitry. If either the master or the slave address driver parities are inconsistent with the parity generated by the address-receiving circuitry, the circuit will indicate that an error has occurred. This solves the problem which could occur if a single address driver were to generate or output an invalid address.

The validity of the received address is checked through the use of predetermined parity bits which are associated with each unique address that can be generated by the address drivers. The predetermined parity bits are stored in a Random Access Memory (RAM) along with their associated data upon initialization of the system, and are compared to the parity bits generated by each of the address drivers (master and slave). Circuits implementing memory chips to store generated parity are shown in U.S. Pat. No. 4,531,213, by Scheuneman, issued Jul. 23, 1985, and U.S. Pat. No. 4,005,405, by West, issued Jan. 25, 1977. Both of these circuits utilize a memory to store parity bits generated from data being written to the memory. During the writing of data to the memory, one or more parity bits are generated from the data, and stored in the memory along with the data. When this data is to be read, a different parity generation circuit generates one or more parity bits from the data which is read. These two sets of parity bits are then compared, and if equal, no error has occurred.

The present invention checks for errors on an address bus coupled to a memory that is only read and not written to. Therefore, rather than generate parity upon issuance of an address and storing the parity in the memory as in the Scheuneman and West patents, the present invention determines the parity at the time of compiling the information to be stored in the ROM or RAM, and appends the predetermined parity bits with the data to be read. The parity bits associated with a particular address are only calculated once, rather than each time the address is issued. Each address will have a predetermined parity associated with it which is stored with the data to be accessed by that address. The Scheuneman and West patents involve the process of generating parity upon a write, storing the parity in the memory, generating a second parity upon a read of that data, and comparing the two generated parities. The present invention generates one parity which is then compared to the predetermined parity stored in the memory chip. One advantage to using predetermined parities is that the compiler can be programmed to determine these parities, and since compilation occurs prior to the time of system operation, these parity values can be verified to ensure accuracy.

The use of redundant address drivers and predetermined stored address parity bits provides a high degree of error protection for address buses. The use of redundant address drivers allows errors in the transmitting circuitry itself to be detected. The parity bits generated at the address drivers are checked against parity at the receiving circuitry, which provides traditional parity checking of the address signal transmission. The use of predetermined parity bits which are stored in a memory device ensures that the address has been received correctly. This invention therefore provides signal error detection beginning at the transmission circuitry, through the transmission bus, and continuing through the receiving circuitry, rather than only checking for parity errors occurring on the bus during transmission.

OBJECTS

It is a primary objective of this invention to provide an improved address error detection system.

It is another object of the present invention to provide redundant address generation and parity generation circuitry for detecting address generation errors.

It is yet another object to provide address-receipt error detection through the use of predetermined address parity bits stored at the receiving circuitry that can be compared to parity bits generated at the redundant address generation circuitry.

It is a further object of the present invention to ascertain the values of the predetermined address parity bits prior to the real-time address transmissions, to provide an opportunity for verification of correctness of the predetermined address parity bits.

It is still another object of the invention to compare the parity bits from each parity generation circuit to the predetermined parity bits to detect a mismatch of parity bits between either address generation circuit's generated parity bits and the predetermined parity bits, to indicate that an error occurred in either address generation circuit, or in the address transmission, or in the receipt of the address.

It is another object to provide parity generation circuitry that provides parity bits for selected groupings of the address lines, so that the source of the address error may be narrowed to such groupings.

It is a further object of the present invention to provide monitoring circuitry to monitor all parity errors, and take action upon recognition of one or more of such parity errors.

Other more detailed objectives will become apparent from a consideration of the Drawings and the Detailed Description of the Preferred Embodiment.

SUMMARY OF THE INVENTION

The Address Verification System Using Parity for Transmitting and Receiving Circuits provides a high degree of protection from erroneous address generation, address transmission, and address receipt. The present invention provides redundant address generation and parity generation, and monitors the resulting parity bits to determine whether the address in question was generated incorrectly. The transmitted address is also verified at the receiving circuitry, which indicates whether the address was transmitted and received without error. The receiving circuitry includes a memory device which stores address parity bits which can be generated at the time of compiling, rather than during normal operation of the system, and these predetermined parity bits can be compared to the parity bits generated at the redundant address generators.

The present invention utilizes dual address drivers which operate simultaneously. Each address driver outputs the same address at the same time. The first address driver, referred to as the master address driver, outputs its address to receiving circuitry which will act on that address. The master address driver also outputs its address to a first parity generator to generate parity bits for each address which is sent to the receiving circuitry. The second address driver, referred to as the slave address driver, simultaneously outputs an identical address to that which the master address driver sent to the receiving circuitry and the first parity generator. The slave address driver outputs its address to a second parity generator to generate parity bits for each address issued by the slave address driver. The redundant parity bits generated by the first and second parity generators are used to determine whether an address generation error in either the master or slave address driver has occurred, by using parity checking circuitry to compare the redundant parity bits to predetermined parity bits stored in a memory device.

The receiving circuitry includes a memory device which can store data. Prior to real-time address transmissions from the address drivers to the receiving circuitry, the expected parity for each potential address which can be sent to the receiving circuitry can be determined. Therefore, for each address which can be sent to the receiving circuitry to retrieve data, predetermined parity bits which indicate the number of set bits in that particular address are stored in the memory device, and are sent to the parity checking circuitry upon receipt of an address sent by the master address driver. Since the receiving circuitry stores predetermined parity bits of what the address parity should be, these bits can then be compared by the parity checking circuitry to the parity bits sent by the first and second parity generators. If the parity bits from either the first or second parity generators do not match the predetermined parity bits, a parity error will be issued indicating that the address received does not have the same number of set bits as was expected.

The parity errors generated are monitored by monitoring circuitry so that action may be taken upon recognition of one or more parity errors. Upon recognition of a parity error, the monitoring circuitry will send a signal to the master and slave address drivers to attempt to resend the address. If a second consecutive parity error is identified by the monitoring circuitry, no further address transmissions will be allowed.

The redundant address drivers which output addresses and generate parity bits provide a means for determining whether the addresses were generated improperly or erroneously. The predetermined parity bits stored in the memory device provide a means for determining whether the addresses were transmitted and received correctly. Since the predetermined parity bits are generated at a time prior to the real-time address transmissions, these parity bits can be manually or automatically checked for accuracy, which give a high assurance that the predetermined parity bits are correct. These characteristics of the present invention provide a high degree of assurance for error-free operation in digital transmissions.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

DETAILED DESCRIPTION OF THE PREFERRED EMBODIMENT

Figure 1:
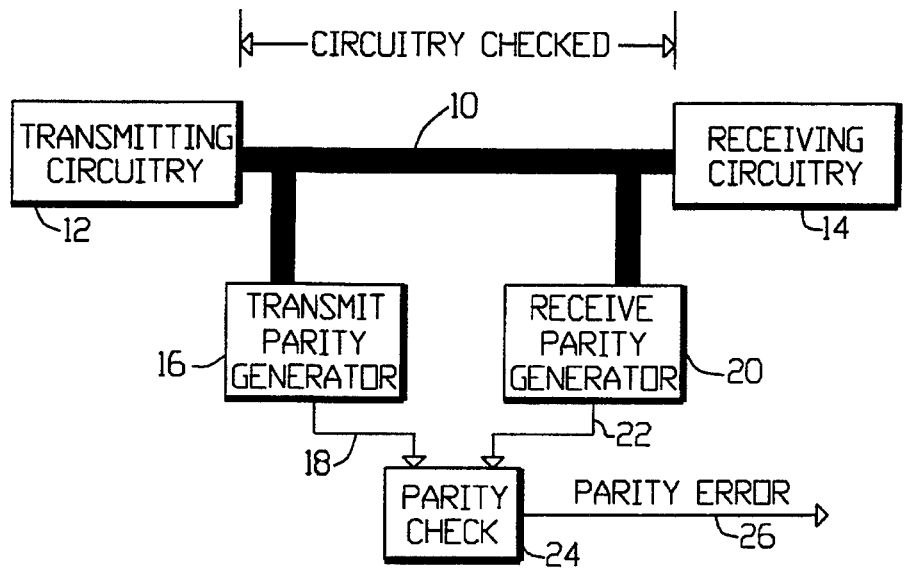
FIG. 1 is a block diagram of a parity checking scheme known in the art.

FIG. 1 is a block diagram of a parity checking scheme known in the art. This type of parity check is used to monitor for accurate data transmission across a data bus. In FIG. 1, Data Bus 10 provides a data path from the Transmitting Circuitry 12 to the Receiving Circuitry 14. Such a data path could be transmitting data or an address to the Receiving Circuitry 14. In order to check for valid data transmission, Transmit Parity Generator 16 is connected to the Data Bus 10 near the output of the Transmitting Circuitry 12. The Transmit Parity Generator 16 will generate a parity bit on Line 18 in which the logic state is dependent upon the number of set bits to be transmitted. The Receive Parity Generator 20 is connected to the Data Bus 10 at the input of the Receiving Circuitry 14, and will generate a parity bit on Line 22 dependent upon the number of set bits which have been received. The parity bits on Lines 18 and 22 are compared by the Parity Check 24, and if equal, a valid data transmission is assumed. If the parity bits are not equal, the data was not transmitted properly, and a PARITY ERROR will be issued on Line 26. Parity generation is well known in the art and will not be described in further detail.

In a parity checking scheme as in FIG. 1, only the validity of the transmitted data is checked. There are no assurances that the data to be transmitted is the correct data, nor are there assurances that the data was received correctly. The present invention helps to ensure that the transmitted signals are generated correctly, transmitted correctly, and received correctly.

Figure 2:
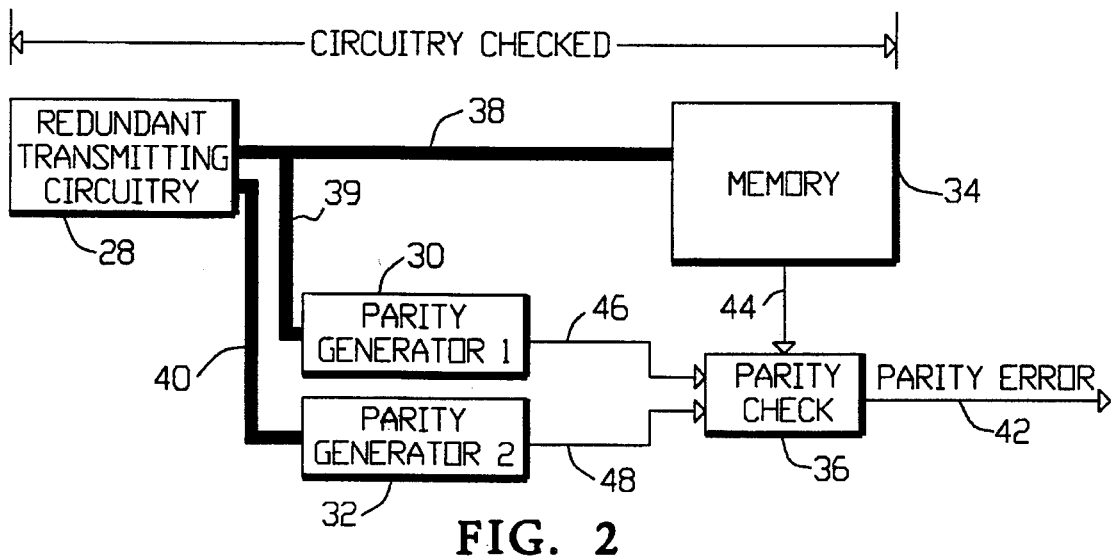
FIG. 2 is a block diagram of the parity checking scheme of the present invention.

FIG. 2 is a block diagram of the parity checking scheme of the present invention. This circuitry includes the Redundant Transmitting Circuitry 28, Parity Generator 1 30, Parity Generator 2 32, Memory 34, and a Parity Check 36 circuit. The Redundant Transmitting Circuitry 28 transmits signals to the Memory 34 across Address Bus 38. The Address Bus 38 is also coupled to Parity Generator 1 30 via Address Bus 39, and a Redundant Address Bus 40 is coupled to Parity Generator 2 32.

The Redundant Transmitting Circuitry 28 of the present invention comprises redundant address drivers. These redundant address drivers simultaneously generate instruction addresses, and the instruction address from the Master Address Driver (not shown) is sent to the Memory 34 to retrieve instruction data. Each of the redundant address drivers generate parity bits at the Parity Generator 1 30 and Parity Generator 2 32 circuits which are compared by the Parity Check 36 circuitry to a predetermined parity stored also in the Memory 34. If the parity bits from either of the redundant address drivers do not match the predetermined parity stored in the Memory 34, a PARITY ERROR on Bus 42 will result. The redundant address drivers allow the signal generation circuitry itself to be checked, so that the generation of an incorrect address will be detected. The operation of the Redundant Transmitting Circuitry 28 will be discussed in further detail in the description of FIG. 3.

The Memory 34 in FIG. 2 provides further assurances against invalid signal transmission. The Memory 34 of the preferred embodiment comprises a memory device which stores the instructions that are to be addressed across the Address Bus 38. At the time of compiling the instructions which are to be stored in the memory, parity generation is also performed where parity bits are generated to be stored with the instruction. Each instruction then has an accompanying number of parity bits which are retrieved at the same time as the instruction is retrieved, and are sent to the Parity Check 36 via Line 44. Parity Generator 1 30 and Parity Generator 2 32 each generate parity bits at the time the address is transmitted across the Address Bus 39 and the Redundant Address Bus 40, and these parity bits are sent to the Parity Check 36 via Lines 46 and 48 respectively. The Parity Check 36 then compares the parity bits on Lines 44, 46 and 48, and any discrepancy will result in a PARITY ERROR on Bus 42. The use of the predetermined parity bits stored in a memory device provides a method of detecting whether the data has been properly received by the Memory 34. If an incorrect address is received across the Address Bus 38, or an incorrect address is accessed within the instruction memory, the parity bits retrieved will not match those parity bits generated by Parity Generator 1 30 and Parity Generator 2 32, and a PARITY ERROR on Bus 42 will result. The operation of the Memory 34 will be discussed in further detail in the description of FIG. 3.

As shown in FIG. 2, the circuitry which can be monitored for faulty address transmissions is expanded over the circuitry which is checked with the traditional parity checking of FIG. 1. The transmitting circuitry itself and the proper receipt of the address are also monitored for errors. This provides a higher degree of reliability that signal transmissions will be error-free.

Figure 3:
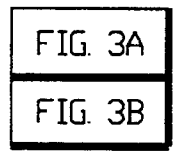
FIG. 3 includes FIG. 3A and FIG. 3B positioned as shown, and illustrates a complete composite logic diagram of the preferred embodiment of the invention.
Figure 3A:
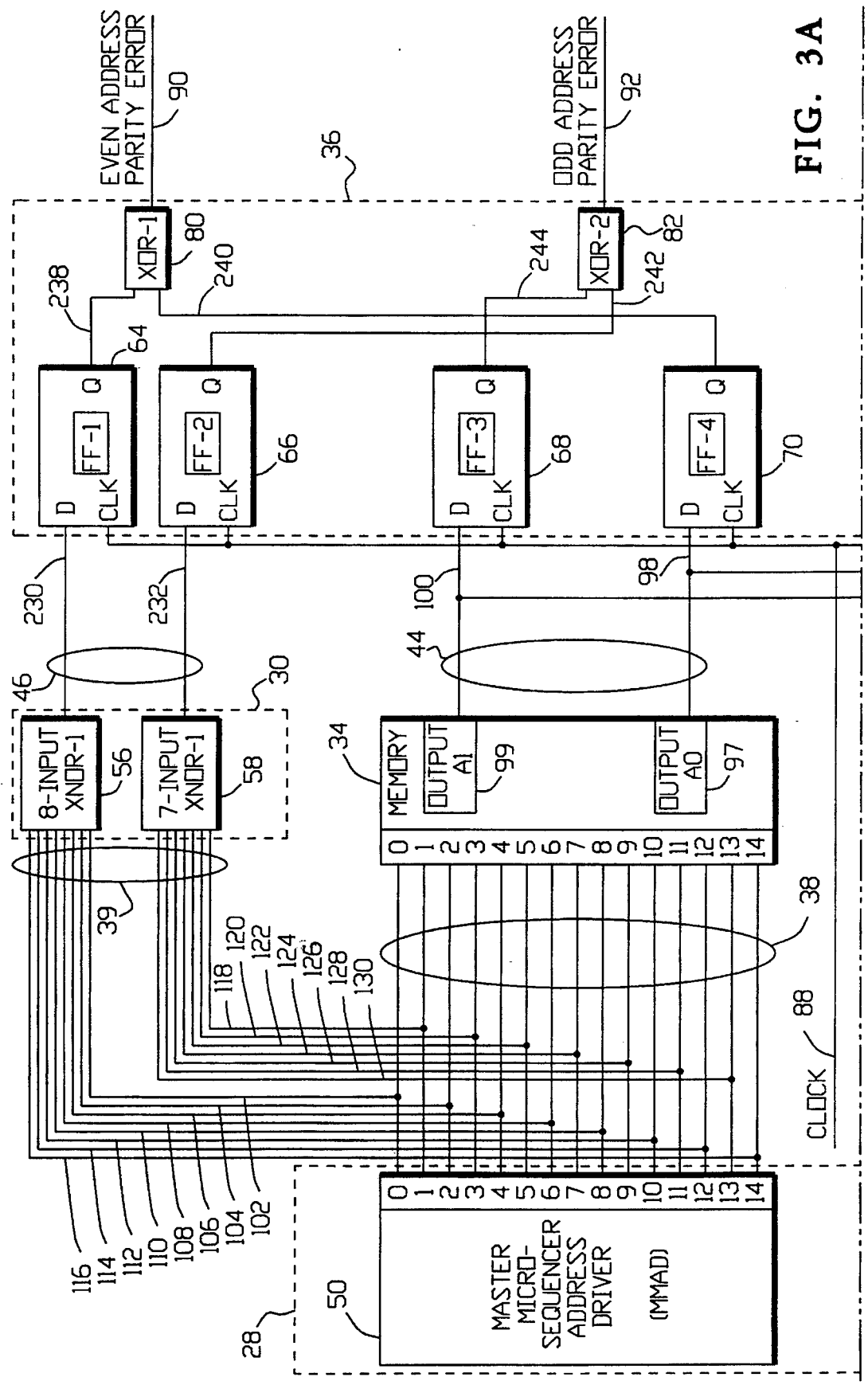
Figure 3B:
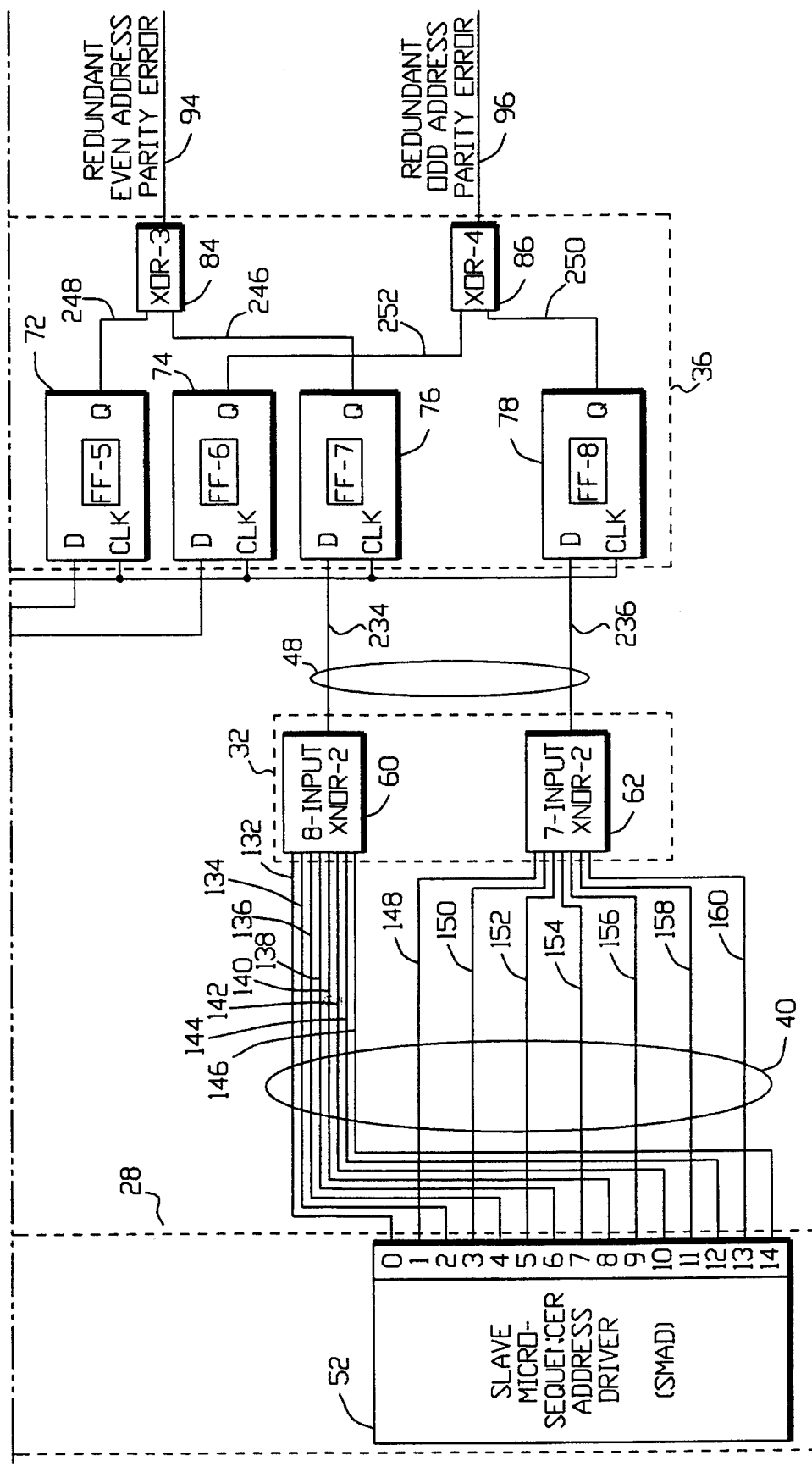

FIG. 3 includes FIG. 3A and FIG. 3B positioned as shown, and illustrates a complete composite logic diagram of the preferred embodiment of the invention. The two redundant address drivers comprising the Redundant Transmitting Circuitry 28 are shown in as the Master Microsequencer Address Driver (MMAD) 50 and the Slave Microsequencer Address Driver (SMAD) 52. Each Address Driver of the preferred embodiment outputs a 15-bit address, labeled BIT 0 through BIT 14. The MMAD 50 and the SMAD 52 are configured to operate simultaneously, and therefore each will generate the same addresses at the same time. The MMAD 50 transmits the generated address to the Memory 34. The address is transmitted from the MMAD 50 to the Memory 34 over the Address Bus 38, and from the MMAD 50 to the Parity Generator 1 30 over the Address Bus 39. Parity Generator 1 30 comprises the 8-input inverting exclusive-OR gate and the 7-input inverting exclusive-OR gate labeled 8-Input XNOR-1 56 and 7-Input XNOR-1 58 respectively. Parity Generator 2 32 comprises the 8-input inverting exclusive-OR gate and the 7-input inverting exclusive-OR gate labeled 8-Input XNOR-2 60 and 7-Input XNOR-2 62 respectively. Finally, the Parity Check 36 circuitry includes eight flip-flops, labeled FF-1 64, FF-2 66, FF-3 68, FF-4 70, FF-5 72, FF-6 74, FF-7 76 and FF-8 78, and four exclusive-OR gates, labeled XOR-1 80, XOR-2 82, XOR-3 84 and XOR-4 86. The flip-flops are clocked by the CLOCK signal on Line 88. The configuration of the preferred embodiment results in four potential parity errors, labeled EVEN ADDRESS PARITY ERROR on Line 90, ODD ADDRESS PARITY ERROR on Line 92, REDUNDANT EVEN ADDRESS PARITY ERROR on Line 94 and REDUNDANT ODD ADDRESS PARITY ERROR on Line 96.

The Memory 34 component in the present invention stores instructions to be accessed by a microprocessor, microcontroller, microsequencer or the like. These software instructions are stored into the Memory 34 using a compiler prior to normal operation of the system. Using known parity generation techniques, parity bits can be generated for each address which will access an instruction in the Memory 34. These parity bits are then appended to and stored with their associated instructions. In the preferred embodiment, two parity bits are generated to be stored with each instruction one parity bit for the odd numbered bits in the instruction address, and one parity bit for the even numbered bits in the instruction address. When an address is issued to the Memory 34 across the Address Bus 38 and an instruction is accessed, these two parity bits are supplied by OUTPUT A0 97 to Line 98 and by OUTPUT A1 99 to Line 100. OUTPUT A0 97 outputs the parity bit generated for the even numbered bits of the instruction address on Line 98, and OUTPUT A1 99 outputs the parity bit generated for the odd numbered bits of the instruction address on Line 100. These parity bits are then compared to parity bits generated at the address drivers, which will be discussed in further detail in a later portion of this description.

The Master Microsequencer Address Driver (MMAD) 50 generates the addresses which are to access instructions stored in the Memory 34. These addresses are transmitted across the Address Bus 38. Therefore, when the MMAD 50 wants to retrieve an instruction, it issues an address on the Address Bus 38, and the instruction stored in the Memory 34 is accessed as well as the two stored address parity bits. The 8-Input XNOR-1 56 and 7-Input XNOR-1 58 which comprise the Parity Generator 1 30 are coupled to the Address Bus 39 which connects to the output of the MMAD 50. In the preferred embodiment, the 8-Input XNOR-1 56 and the 7-Input XNOR-1 58 are part of the same microsequencer comprising the MMAD 50. The 8-Input XNOR-1 56 generates a parity bit for the even address bits, and the 7-input XNOR-1 58 generates a parity bit for the odd address bits. Therefore, address BIT 0 on Line 102, BIT 2 on Line 104, BIT 4 on Line 106, BIT 6 on Line 108, BIT 8 on Line 110, BIT 10 on Line 112, BIT 12 on Line 114 and BIT 14 on Line 116 from the MMAD 50 are coupled to the 8-Input XNOR-i 56, and address BIT 1 on Line 118, BIT 3 on Line 120, BIT 5 on Line 122, BIT 7 on Line 124, BIT 9 on Line 126, BIT 11 on Line 128 and BIT 13 on Line 130 from the MMAD 50 are coupled to the 7-Input XNOR-1 58.

The Slave Microsequencer Address Driver (SMAD) 52 simultaneously generates identical addresses to those which the MMAD 50 are generating. The addresses generated by the SMAD 52 are not transmitted across the Address Bus 38 to the Memory 34, but rather these addresses are transmitted on the Redundant Address Bus 40 to the Parity Generator 2 32 circuitry which consists of a 8-input inverting exclusive-OR gate and a 7-input inverting exclusive-OR gate, labeled 8-Input XNOR-2 60 and 7-Input XNOR-2 62 respectively. The 8-Input XNOR-2 60 and 7-Input XNOR-2 62 which comprise the Parity Generator 2 32 are coupled to the Redundant Address Bus 40 which connects to the output of the SMAD 52. In the preferred embodiment, the 8-Input XNOR-2 60 and the 7-Input XNOR-2 62 are part of the same microsequencer comprising the SMAD 52. The 8-Input XNOR-2 60 generates a parity bit for the even address bits, and the 7-input XNOR-2 62 generates a parity bit for the odd address bits. Therefore, address BIT 0 on Line 132, BIT 2 on Line 134, BIT 4 on Line 136, BIT 6 on Line 138, BIT 8 on Line 140, BIT 10 on Line 142, BIT 12 on Line 144 and BIT 14 on Line 146 from the SMAD 52 are coupled to the 8-Input XNOR-2 60, and address BIT 1 on Line 148, BIT 3 on Line 150, BIT 5 on Line 152, BIT 7 on Line 154, BIT 9 on Line 156, BIT 11 on Line 158 and BIT 13 on Line 160 from the SMAD 52 are coupled to the 7-Input XNOR-2 62.

Figures 4, 5:
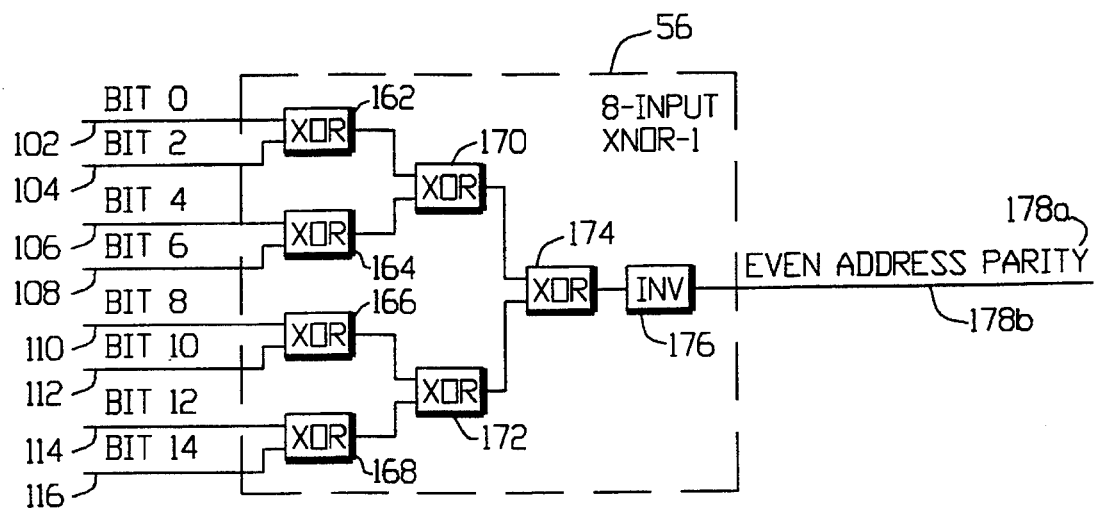
FIG. 4 is a schematic diagram showing the composition of the 8-Input inverting exclusive-OR gate.
FIG. 5 is a table showing the state of the Even Address Parity signal at various states of the address bits.

FIG. 4 is a schematic diagram showing the composition of the 8-Input inverting exclusive-OR gate, labeled 8-Input XNOR-1 56. The BIT 0 signal on Line 102 and the BIT 2 signal on Line 104 are inputs to XOR 162, the BIT 4 signal on Line 106 and the BIT 6 signal on Line 108 are inputs to XOR 164, the BIT 8 signal on Line 110 and the BIT 10 signal on Line 112 are inputs to XOR 166, and the BIT 12 signal on Line 114 and the BIT 14 signal on Line 116 are inputs to XOR 168. These exclusive-OR gate outputs are inputs to XOR 170 and XOR 172, the outputs of which become the inputs to XOR 174. The output of XOR 174 is inverted by an inverter, labeled INV 176, to generate a logic high EVEN ADDRESS PARITY 178a signal on Line 178b when no address bits or when an even number of address bits are set to a high logic level.

FIG. 5 is a table showing the state of the EVEN ADDRESS PARITY 178a signal at various states of the address bits. In each instance where no address bits or an even number of address bits are set to a high logic level, the EVEN ADDRESS PARITY 178a signal is set to a high logic level. For instance, looking at Row 180 where the BIT 0, 2, 4, 6, 8 and 10 signals in Columns 182, 184, 186, 188, 190, and 192 respectively are at a low logic level, and the BIT 12 and 14 signals in Columns 194 and 196 respectively are at a high logic level, an even number of bits are set to a high logic level, and the EVEN ADDRESS PARITY 178a signal is set to a high logic level.

Figures 6, 7:
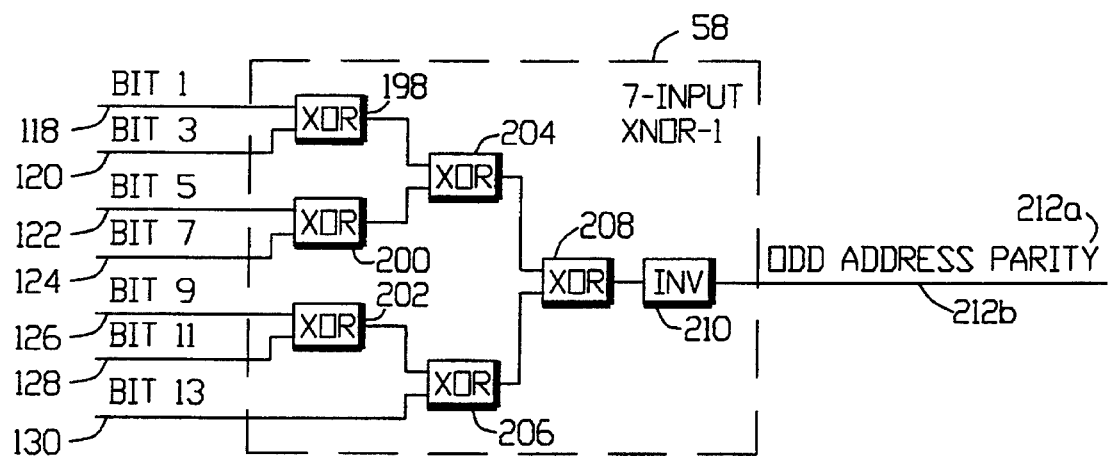
FIG. 6 is a schematic diagram showing the composition of the 7-Input inverting exclusive-OR gate.
FIG. 7 is a table showing the state of the Odd Address Parity signal at various states of the address bits.

FIG. 6 is a schematic diagram showing the composition of the 7-Input inverting exclusive-OR gate, labeled 7-Input XNOR-1 58. The BIT 1 signal on Line 118 and the BIT 3 signal on Line 120 are inputs to XOR 198, the BIT 5 signal on Line 122 and the BIT 7 signal on Line 124 are inputs to XOR 200, and the BIT 9 signal on Line 126 and the BIT 11 signal on Line 128 are inputs to XOR 202. The outputs of XOR 198 and XOR 200 are inputs to XOR 204, and the BIT 13 signal on Line 130 and the output of XOR 202 are inputs to XOR 206. The outputs of XOR 204 and XOR 206 become the inputs to XOR 208, which is inverted by an inverter, labeled INV 210, to generate a logic high ODD ADDRESS PARITY 212a signal on Line 212b when no address bits or when an even number of address bits are set to a high logic level.

FIG. 7 is a table showing the state of the ODD ADDRESS PARITY 212a signal at various states of the address bits. In each instance where no address bits or an even number of address bits are set to a high logic level, the ODD ADDRESS PARITY 212a signal is set to a high logic level. For instance, looking at Row 214 where the BIT 1, 3, 5, 7, 9 and 13 signals in Columns 216, 218, 220, 222, 224, and 226 respectively are at a low logic level, and the BIT 11 signal in Column 228 is at a high logic level, an odd number of bits are set to a high logic level, and the ODD ADDRESS PARITY 212a signal is set to a low logic level.

Returning to FIG. 3, the circuit for the 8-Input XNOR-2 60 is identical to the circuit shown in FIG. 4 for the 8-Input XNOR-1 56, and the circuit for the 7-Input XNOR-2 62 is identical to the circuit for the 7-Input XNOR-1 58 shown in FIG. 6. Accordingly, the truth tables shown in FIG. 5 and FIG. 7 apply equally to the 8-Input XNOR-2 60 and the 7-Input XNOR-2 62 respectively.

The MMAD 50 and the SMAD 52 each generate the same address at the same time, and each generate even address parity bits and odd address parity bits. Each of the parity bits generated must then be compared to the predetermined parity bits which are stored in the Memory 34. The Parity Check 36 circuitry performs this comparison, and issues a PARITY ERROR signal (which comprises multiple signals as will be seen in FIG. 3) on Bus 42 upon recognition of unequal parity bits.

As seen in FIG. 3, the Memory 34 has two outputs, labeled OUTPUT A0 97 and OUTPUT A1 99 which output the predetermined parity bits. Upon receipt of an address from the MMAD 50 across the Address Bus 38, OUTPUT A0 97 outputs the predetermined parity bit associated with the even address bits, and OUTPUT A1 99 outputs the predetermined parity bit associated with the odd address bits. Each of these predetermined parity bits are then compared to the parity generated by Parity Generator 1 30 and Parity Generator 2 32. The 8-Input XNOR-1 56 outputs the EVEN ADDRESS PARITY signal on Line 230 to the D input of a flip-flop labeled FF-1 64. The 7-Input XNOR-1 58 outputs the ODD ADDRESS PARITY signal on Line 232 to the D input of FF-2 66. Lines 230 and 232 comprise Bus 46. The OUTPUT A0 97, which outputs the PREDETERMINED EVEN ADDRESS PARITY signal on Line 98, is coupled to the D input of FF-4 70 and FF-5 72, and the OUTPUT A1 99, which outputs the PREDETERMINED ODD ADDRESS PARITY signal on Line 100, is coupled to the D input of FF-3 68 and FF-6 74. Line 98 and 100 comprise Bus 44. The 8-Input XNOR-2 60 outputs the REDUNDANT EVEN ADDRESS PARITY signal on Line 234 to the D input of FF-76, and the 7-Input XNOR-2 62 outputs the REDUNDANT ODD ADDRESS PARITY signal on Line 236 to the D input of FF-8 78. Line 234 and 236 comprise Bus 48. Therefore, all generated and predetermined parity bits are latched by the flip-flops residing in the Parity Check 36 circuitry. The flip-flops are latched on the occurrence of an active triggering edge of the CLOCK signal on Line 88.

Once latched by the flip-flops, four 2-input exclusive-OR gates monitor for parity errors. XOR-1 80 receives the LATCHED EVEN ADDRESS PARITY signal on Line 238 from FF-1 64, and the LATCHED PREDETERMINED EVEN ADDRESS PARITY signal on Line 240 from FF-4 70. XOR-1 80 checks that both of these latched parity bits are equal, and if not, an EVEN ADDRESS PARITY ERROR signal will be issued on Line 90. XOR-2 82 receives the LATCHED ODD ADDRESS PARITY signal on Line 242 from FF-2 66, and the LATCHED PREDETERMINED ODD ADDRESS PARITY signal on Line 244 from FF-3 68. XOR-2 82 checks that both of these latched parity bits are equal, and if not, an ODD ADDRESS PARITY ERROR signal will be issued on Line 92. XOR-3 84 receives the LATCHED REDUNDANT EVEN ADDRESS PARITY signal on Line 246 from FF-7 76, and the LATCHED PREDETERMINED EVEN ADDRESS PARITY signal on Line 248 from FF-5 72. XOR-3 84 checks that both of these latched parity bits are equal, and if not, a REDUNDANT EVEN ADDRESS PARITY ERROR signal will be issued on Line 94. XOR-4 86 receives the LATCHED REDUNDANT ODD ADDRESS PARITY signal on Line 250 from FF-8 78, and the LATCHED PREDETERMINED EVEN ADDRESS PARITY signal on Line 252 from FF-6 74. XOR-4 86 checks that both of these latched parity bits are equal, and if not, a REDUNDANT ODD ADDRESS PARITY ERROR signal will be issued on Line 96.

The EVEN ADDRESS PARITY ERROR signal on Line 90 will indicate that the PREDETERMINED EVEN ADDRESS PARITY signal on Line 98 for the given address issued by the MMAD 50 does not match the EVEN ADDRESS PARITY signal on Line 230 which is generated for the even address bits of the Address Bus 39. The ODD ADDRESS PARITY ERROR signal on Line 92 will indicate that the PREDETERMINED ODD ADDRESS PARITY signal on Line 100 for the given address issued by the MMAD 50 does not match the ODD ADDRESS PARITY signal on Line 232 which is generated for the odd address bits of the Address Bus 39. By comparing the generated parity with the predetermined parity, correct address transmission and correct address receipt can be monitored. Correct address receipt may be detected since an address which accesses an incorrect instruction will also output incorrect parity bits at the Memory 34 outputs labeled OUTPUT A0 97 and OUTPUT A1 99. These incorrect parity bits would be recognized upon comparison with the generated EVEN ADDRESS PARITY signal on Line 230 and/or the generated ODD ADDRESS PARITY signal on Line 232.

The REDUNDANT EVEN ADDRESS PARITY ERROR signal on Line 94 and the REDUNDANT ODD ADDRESS PARITY ERROR signal on Line 96 will indicate whether correct address generation has occurred. The SMAD 52 simultaneously generates the same address that the MMAD 50 generates to access a particular instruction from the Memory 34. The address parity that is generated by Parity Generator 2 32 for the SMAD 52 address is compared to the predetermined parity outputted to Line 98 and Line 100. Therefore, if the MMAD 50 generates an incorrect address, the address that the SMAD 52 generates will be compared to the predetermined parity in the Memory 34 which is associated with an instruction that was accessed by an incorrect MMAD 50 address. A REDUNDANT EVEN ADDRESS PARITY ERROR signal on Line 94 and/or a REDUNDANT ODD ADDRESS PARITY ERROR signal on Line 96 should occur if the MMAD 50 generates an incorrect address, since the SMAD 52 independently generates the same address and associated parity bits. This redundancy in address drivers and parity generation will detect an incorrectly generated MMAD 50 address where a single address driver would not, because Parity Generation 1 30 generates parity bits for whatever address the MMAD 50 outputs to the Address Buses 38 and 39. Therefore, without the redundant address driver (SMAD 52), the Parity Generation 1 30 circuitry would generate parity for the incorrect address, and the error would go undetected.

Figure 8:
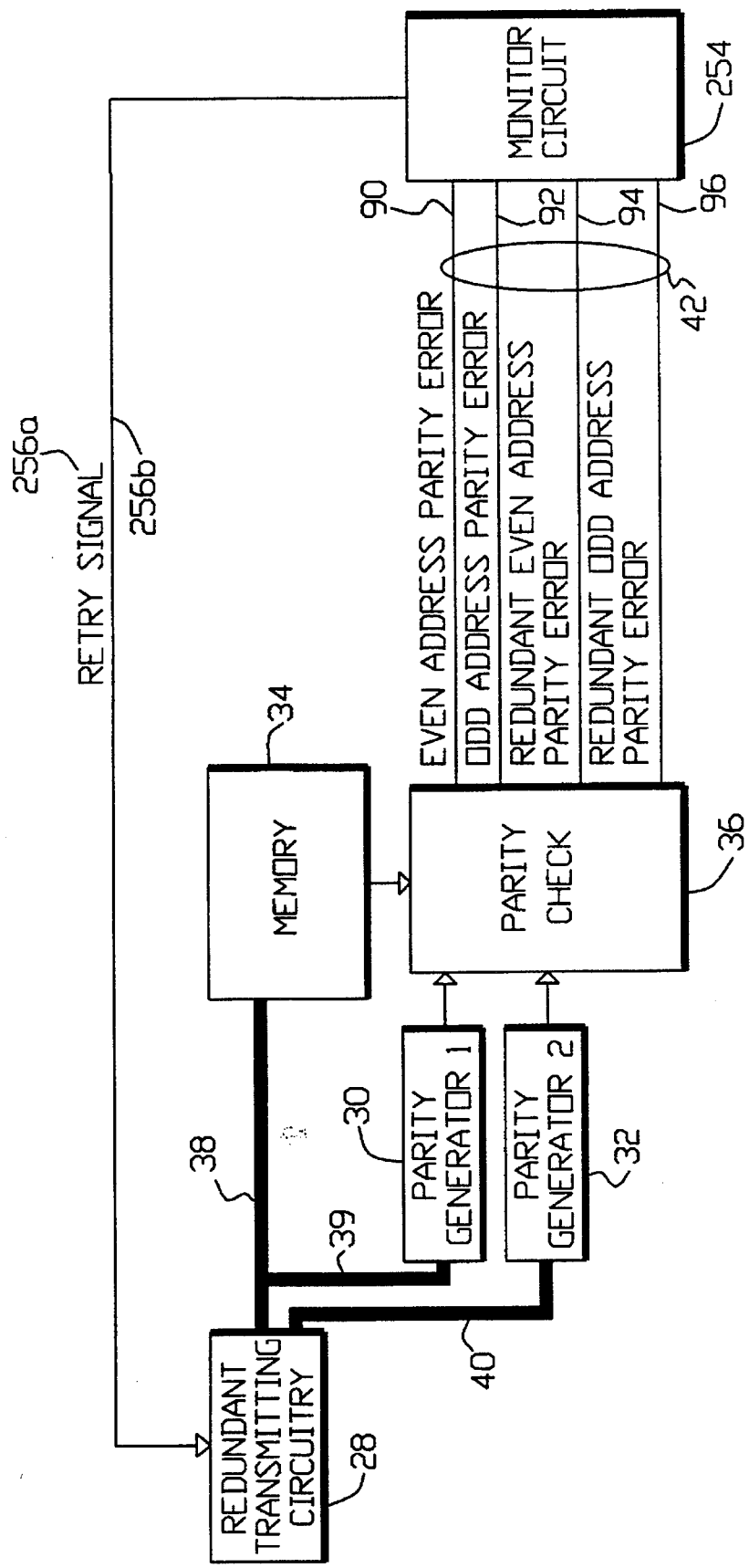
FIG. 8 shows the monitoring circuitry for monitoring the parity errors.

FIG. 8 shows the monitoring circuitry for monitoring the parity errors. The Parity Check 36 circuitry outputs four parity error signals, including the EVEN ADDRESS PARITY ERROR signal on Line 90, the ODD ADDRESS PARITY ERROR signal on Line 92, the REDUNDANT EVEN ADDRESS PARITY ERROR signal on Line 94, and the REDUNDANT ODD ADDRESS PARITY ERROR signal on Line 96. Lines 90, 92, 94, and 96, comprise Bus 42. The Monitor Circuit 254 receives these parity error signals and monitors for an active parity error. Upon recognition of an active parity error signal, the Monitor Circuit 254 will send a Retry Signal 256a on Line 256b to the Redundant Transmitting Circuitry 28 to indicate to the Master Microsequencer Address Driver (MMAD) 50 and the Slave Microsequencer Address Driver (SMAD) 52 to send the address a second time. The Monitor Circuit 254 will cause the system to stop if a parity error occurs on the second attempt to send the address.

Any hardware or software method known in the art for monitoring the four parity error signals could be implemented. In the preferred embodiment, a microprocessor-based monitoring circuit was implemented, where the occurrence of an active parity error sets internal fault lines which are monitored by the microprocessor-based circuit.

The Address Verification System Using Parity for Transmitting and Receiving Circuits provides a greater degree of error recognition for address transfers than typical parity schemes for data/address transmission. This is due to the redundant address drivers which simultaneously generate address and associated parity bits, and the predetermined parity bits which are accessed along with an addressed instruction. The present invention provides error recognition for the address generation circuitry, the address transmission, and the address receipt circuitry.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. An address error detection apparatus for detecting address generation, address transmission, and address reception errors, comprising:

first address generation means for generating a first digital address;

first address bus means coupled to said first address generation means for providing a transmission path for said first digital address;

first parity generation means coupled to said first address generation means, for receiving said first digital address and generating a plurality of first generated parity bits in response thereto;

memory means coupled to said first address bus means for receiving said first digital address, and for providing data and a plurality of predetermined, fixed parity bits in response to said first digital address; and first parity checking means coupled to said first parity generation means and said memory means, for receiving and comparing said plurality of first generated parity bits and said plurality of predetermined, fixed parity bits, and for generating first parity error indications upon detection of unequal ones of said plurality of first generated parity bits and said plurality of predetermined, fixed parity bits.

2. An address error detection apparatus as in claim 1, further comprising:

second address generation means for generating a second digital address equal to and simultaneously with said first digital address;

second address bus means coupled to said second address generation means for providing a transmission path for said second digital address;

second parity generation means coupled to said second address generation means, for receiving said second digital address and generating a plurality of second generated parity bits in response thereto; and second parity checking means coupled to said second parity generation means and said memory means, for receiving and comparing said plurality of second generated parity bits and said plurality of predetermined, fixed parity bits, and for generating second parity error indications upon detection of unequal ones of said plurality of second generated parity bits and said plurality of predetermined, fixed parity bits.

3. An address error detection apparatus as in claim 2, wherein said first parity generation means comprises:

first odd address parity means for receiving first odd address bits of said first digital address, and for generating a first odd address parity indication responsive to a first total number of said first odd address bits of said first digital address which are set to a first pre-selected logic level; and first even address parity means for receiving first even address bits of said first digital address, and for generating a first even address parity indication responsive to a second total number of said first even address bits of said first digital address which are set to a second pre-selected logic level.

4. An address error detection apparatus as in claim 3, wherein said second parity generation means comprises:

second odd address parity means for receiving second odd address bits of said second digital address, and for generating a second odd address parity indication responsive to a third total number of said second odd address bits of said second digital address which are set to said first pre-selected logic level; and second even address parity means for receiving second even address bits of said second digital address, and for generating a second even address parity indication responsive to a fourth total number of said second even address bits of said second digital address which are set to said second pre-selected logic level.

5. An address error detection apparatus as in claim 4, wherein said first parity checking means comprises:

first latching means coupled to said first odd address parity means, said first even address parity means, and said memory means, for receiving and latching said first odd address parity indication, said first even address parity indication, and said plurality of predetermined, fixed parity bits respectively, and for providing in response thereto a first latched odd address parity indication, a first latched even address parity indication, and a plurality of first latched predetermined parity bits;

first even parity checking means coupled to said first latching means for receiving said first latched even address parity indication and specified ones of said plurality of first latched predetermined parity bits, and for generating in response thereto a first even parity error indication upon recognition of unlike logic levels; and first odd parity checking means coupled to said first latching means for receiving said first latched odd address parity indication and specified ones of said plurality of first latched predetermined parity bits, and for generating in response thereto a first odd parity error indication upon recognition of unlike logic levels.

6. An address error detection apparatus as in claim 5, wherein said second parity checking means comprises:

second latching means coupled to said second odd address parity means, said second even address parity means, and said memory means, for receiving and latching said second odd address parity indication, said second even address parity indication, and said plurality of predetermined, fixed parity bits respectively, and for providing in response thereto a second latched odd address parity indication, a second latched even address parity indication, and a plurality second latched predetermined parity bits;

second even parity checking means coupled to said second latching means for receiving said second latched even address parity indication and specified ones of said plurality of second latched predetermined parity bits, and for generating in response thereto a second even parity error indication upon recognition of unlike logic levels; and second odd parity checking means coupled to said second latching means for receiving said second latched odd address parity indication and specified ones of said plurality of second latched predetermined parity bits, and for generating in response thereto a second odd parity error indication upon recognition of unlike logic levels.

7. An address error detection apparatus as in claim 2, further comprising:

parity error monitoring means coupled to said first parity checking means and to said second parity checking means, for receiving said first parity error indications and said second parity errors indications respectively, and for recognizing active ones of said first or second parity error indications, and for sending an address-resend signal to said first address generation means and said second address generation means to retransmit said first digital address and said second digital address upon recognition of a first occurrence of one or more active ones of said first or second parity error indications, and for terminating further address transmissions upon recognition of a second consecutive occurrence of one or more active ones of said first or second parity error indications.

8. An address error detection apparatus for detecting address generation and address transmission errors, having receiving circuitry to receive a digital address and to output one or more even address parity bits and one or more odd address parity bits in response to a first number of set and cleared even address bits in the digital address and a second number of set and cleared odd address bits in the digital address respectively, the address error detection apparatus comprising:

first address generation means for generating the digital address;

second address generation means for generating a second digital address equal to and simultaneously with the digital address;

first address bus means coupled to said first address generation means for providing a transmission path for the digital address to the receiving circuitry;

second address bus means coupled to said second address generation means for providing a transmission path for said second digital address;

first parity generation means coupled to said first address generation means, for receiving the digital address and generating a plurality of first generated parity bits in response thereto;

second parity generation means coupled to said second address generation means, for receiving said second digital address and generating a plurality of second generated parity bits in response thereto; and parity checking means coupled to said first parity generation means, said second parity generation means, and the receiving circuitry, for receiving said plurality of first generated parity bits, said plurality of second generated parity bits, the one or more even address parity bits and the one or more odd address parity bits, and for generating parity error indications upon detection of unequal ones of said plurality of first generated parity bits and the one or more even address parity bits or the one or more odd address parity bits, or upon detection of unequal ones of said plurality of second generated parity bits and the one or more even address parity bits or the one or more odd address parity bits.

9. An address error detection apparatus as in claim 8, wherein said plurality of first generated parity bits comprise:

a first odd address parity indication responsive to a first total number of the second number of set and cleared odd address bits of the digital address which are set to a first pre-selected logic level; and a first even address parity indication responsive to a second total number of the first number of set and cleared even address bits of the digital address which are set to a second pre-selected logic level.

10. An address error detection apparatus as in claim 9, wherein said plurality of second generated parity bits comprise:

a second odd address parity indication responsive to a third total number of odd address bits of said second digital address which are set to said first pre-selected logic level; and a second even address parity indication responsive to a fourth total number of even address bits of said second digital address which are set to said second preselected logic level.

11. An address error detection apparatus as in claim 10, wherein said parity checking means comprises:

latching means coupled to said first parity generation means, said second parity generation means, and the receiving circuitry, for receiving and latching said first odd address parity indication, said first even address parity indication, said second odd address parity indication, said second even address parity indication, the one or more even address parity bits, and the one or more odd address parity bits, and for providing in response thereto a first latched odd address parity indication, a first latched even address parity indication, a second latched odd address parity indication, a second latched even address parity indication, latched even address parity bits, and latched odd address parity bits respectively;

first odd parity checking means coupled to said latching means for receiving said first latched odd address parity indication and said latched odd address parity bits, and for generating in response thereto a first odd parity error indication upon recognition of unlike logic levels;

first even parity checking means coupled to said latching means for receiving said first latched even address parity indication and said latched even address parity bits, and for generating in response thereto a first even parity error indication upon recognition of unlike logic levels;

second odd parity checking means coupled to said latching means for receiving said second latched odd address parity indication and said latched odd address parity bits, and for generating in response thereto a second odd parity error indication upon recognition of unlike logic levels; and second even parity checking means coupled to said latching means for receiving said second latched even address parity indication and said latched even address parity bits, and for generating in response thereto a second even parity error indication upon recognition of unlike logic levels.

12. An address error detection apparatus as in claim 11, further comprising:

parity error monitoring means coupled to said parity checking means, for receiving and recognizing said first odd parity error indication, said first even parity error indication, said second odd parity error indication, and said second even parity error indication, and for sending an address-resend signal to said first address generation means and said second address generation means to retransmit the digital address and said second digital address upon recognition of a first occurrence of said first odd parity error indication, said first even parity error indication, said second odd parity error indication, or said second even parity error indication, and for terminating further address transmissions upon recognition of a second consecutive occurrence of said first odd parity error indication, said first even parity error indication, said second odd parity error indication, or said second even parity error indication.

13. An address error detection apparatus for detecting address generation, address transmission, and address reception errors, comprising:

a first digital address driver having multiple outputs to output a first digital address;

a second digital address driver having multiple outputs to output a second digital address equal to and simultaneously with said first digital address;

a first address bus having multiple first address lines coupled to said multiple outputs of said first digital address driver to transmit said first digital address;

a second address bus having multiple second address lines coupled to said multiple outputs of said second digital address driver to transmit said second digital address;

a first even exclusive-OR array having first multiple inputs, each one of said first multiple inputs being coupled to a different one of said multiple first address lines that transmits first even bits of said first digital address, and having a first even address parity output terminal to output a first even address parity bit;

a first odd exclusive-OR array having second multiple inputs, each one of said second multiple inputs being coupled to a different one of said multiple first address lines that transmits first odd bits of said first digital address, and having a first odd address parity output terminal to output a first odd address parity bit;

a second even exclusive-OR array having third multiple inputs, each one of said third multiple inputs being coupled to a different one of said multiple second address lines which transmits second even bits of said second digital address, and having a second even address parity output terminal to output a second even address parity bit;

a second odd exclusive-OR array having fourth multiple inputs, each one of said fourth multiple inputs being coupled to a different one of said multiple second address lines which transmits second odd bits of said second digital address, and having a second odd address parity output terminal to output a second odd address parity bit;

memory circuitry coupled to said multiple first address lines of said first address bus, having memory storage to store data, and to store predetermined even address parity bits and predetermined odd address parity bits generated from each said first digital address which can be driven by said first digital address driver, and having a first memory output terminal to output said predetermined even address parity bits and a second memory output terminal to output said predetermined odd address parity bits;

a latching circuit coupled to said first even address parity output terminal, said first odd address parity output terminal, said second even address parity output terminal, said second odd address parity output terminal, said first memory output terminal, and said second memory output terminal, having flip-flops to latch said first even address parity bit, said first off address parity bit, said second even address parity bit, said second odd address parity bit, said predetermined even address parity bits, and said predetermined odd address parity bits respectively, and having output terminals to output a latched first even address parity bit, a latched first odd address parity bit, a latched second even address parity bit, a latched second odd address parity bit, a latched predetermined even address parity bit, and a latched predetermined odd address parity bit;

a first exclusive-OR gate coupled to said latching circuit having inputs to receive said latched first even address parity bit and said latched predetermined even address parity bit, and having an output terminal to generate a first even parity error indication upon recognition of unlike logic levels;

a second exclusive-OR gate coupled to said latching circuit having inputs to receive said latched first odd address parity bit and said latched predetermined odd address parity bit, and having an output terminal to generate a first odd parity error indication upon recognition of unlike logic levels;

a third exclusive-OR gate coupled to said latching circuit having inputs to receive said latched second even address parity bit and said latched predetermined even address parity bit, and having an output terminal to generate a second even parity error indication upon recognition of unlike logic levels; and a fourth exclusive-OR gate coupled to said latching circuit having inputs to receive said latched second odd address parity bit and said latched predetermined odd address parity bit, and having an output terminal to generate a second odd parity error indication upon recognition of unlike logic levels.

14. An address error detection apparatus as in claim 13, further comprising:

a monitoring circuit having input terminals coupled to said first exclusive-OR gate, said second exclusive-OR gate, said third exclusive-OR gate, and said fourth exclusive-OR gate, and having circuitry to recognize said first even parity error indication, said first odd parity error indication, said second even parity error indication, and said second odd parity error indication, and having an output terminal for sending an address-resend signal to said first digital address driver and said second digital address driver upon recognition of of said first even parity error indication, said first odd parity error indication, said second even parity error indication, or said second odd parity error indication, whereby, upon recognition of said address-resend signal, said first digital address driver and said second digital address driver will retransmit said first digital address and said second digital address following a first occurrence of said address-resend signal, and will terminate further address transmissions upon recognition of a second consecutive occurrence of said address-resend signal.

15. An address error detection apparatus as in claim 1, wherein said plurality of predetermined, fixed parity bits are generated prior to real-time address transmissions.

* * * * *